(12) United States Patent
Hayashi

(10) Patent No.: US 6,694,092 B1
(45) Date of Patent: Feb. 17, 2004

(54) INFORMATION RECORDING APPARATUS AND METHOD, INFORMATION REPRODUCTION APPARATUS AND METHOD, AND INFORMATION RECORDING MEDIUM

(75) Inventor: Nobuhiro Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/384,613

(22) Filed: Aug. 27, 1999

(30) Foreign Application Priority Data

Sep. 4, 1998 (JP) .......................... P10-250246

(51) Int. Cl.⁷ .......................... H04N 7/26; H04N 7/64
(52) U.S. Cl. .................. 386/124; 386/109; 386/114
(58) Field of Search ................ 386/124, 109, 386/111, 112, 68, 27, 33, 104, 96, 67, 69, 6, 21, 39, 40, 76, 95, 100, 113, 114; H04N 7/26, 7/64

(56) References Cited

U.S. PATENT DOCUMENTS 5,335,117 A * 8/1994 Park et al.
5,377,051 A * 12/1994 Lane et al.
5,592,343 A * 1/1997 Park et al.

* cited by examiner

Primary Examiner—Robert Chevalier
(74) Attorney, Agent, or Firm—Oblon, Spivak, McClelland, Maier & Neustadt, P.C.

(57) ABSTRACT

An information recording apparatus and method, an information reproduction apparatus and method and an information recording medium which satisfy both of the random access capability and the real time performance. First blocks each of which includes a first error correction code for data of a unit of a predetermined data amount and second blocks each of which includes a second error correction code for the data of each predetermined number of the first blocks are recorded in such a manner that they can be reproduced independently of each other. This enables use of a small sector length which is a minimum unit of recording and reproduction with first error correction codes and formation of second error correction codes as independent sectors upon formation of error correction codes as dual product codes.

2 Claims, 4 Drawing Sheets

INFORMATION RECORDING APPARATUS AND METHOD, INFORMATION REPRODUCTION APPARATUS AND METHOD, AND INFORMATION RECORDING MEDIUM

BACKGROUND OF THE INVENTION

This invention relates to an information recording apparatus and method, an information reproduction method and apparatus, and an information recording medium suitable for use where various data are recorded onto a recording medium such as a magnetic tape or a magnetic disk as a storage device for a computer.

Conventional information reproduction apparatus such as a hard disk apparatus cannot eliminate appearance of an error at a fixed rate in data reproduced from a recording medium. Therefore, an apparatus of the type mentioned sets a sector length which is a unit of recording and reproduction and an error correction code length in accordance with a characteristic of data.

Since a computer frequently processes a file of a comparatively small size and is required to quickly access various files recorded discretely on a recording medium, it is required to have a high random access performance (hereinafter referred to as random access capability).

Therefore, a magnetic disk apparatus used as a storage device for a computer divides data to be used for recording and/or reproduction into blocks each including a short unit of data and processes the data for the individual blocks (or in other words, sectors of a reduced sector length) to assure a high random access capability. Further, when necessary, the magnetic disk apparatus repeats a retrying operation to compensate for the error correction capability which is deteriorated by the reduction of the sector length so that data can be reproduced with a high degree of reliability.

On the other hand, audio data and/or video data (hereinafter referred to as AV data) are recorded in a comparatively large continuous file on a recording medium, and it is required that the continuous data be reproduced on the real time basis.

Therefore, a data storage apparatus for a video apparatus such as a digital video tape recorder handles data of a comparatively large sector length to effectively prevent an increase in redundancy and strengthen the error correction capability so that data can be successively reproduced with a high degree of reliability.

FIG. 3 shows a magnetic disk apparatus used as a storage apparatus for a computer and employing a hard disk. Referring to FIG. 3, the magnetic disk apparatus 1 shown includes a recording and reproduction circuit 2 which is controlled by a controller 3 and converts, upon recording, data trains outputted from the controller 3 into a serial data train to produce a magnetic head driving signal REC to be used for driving a magnetic head not shown. Upon reproduction, the recording and reproduction circuit 2 processes a reproduction signal PB outputted from the magnetic head to reproduce data recorded on the hard disk and outputs the reproduced data to the controller 3. In the operation of the magnetic disk apparatus 1 described, an error appears at a fixed rate in the data.

A central processing unit (CPU) 4 receives a control command transmitted from a host computer not shown through the controller 3 and controls operation of the controller 3 in accordance with the control command. The central processing unit 4 thus controls operation of the entire magnetic disk apparatus 1 so that a file of the data train outputted from the host computer may be recorded onto the hard disk and conversely a file designated from the host computer may be reproduced from the hard disk.

In the control, the central processing unit 4 confirms a free area of the hard disk and other necessary information from management data recorded in the innermost circumferential record area of the hard disk to control a sequence of operations, and, when necessary, transmits status data corresponding to the control command to the host computer through the controller 3.

A random access memory (RAM) 5 temporarily stores data outputted from the controller 3 and outputs the data to the controller 3 to buffer data D1 to be inputted to or outputted from the host computer through the controller 3.

The controller 3 receives the data D1 outputted from the host computer and transmits data of a control command included in the data D1 to the central processing unit 4. The controller 3 converts those data included in the data D1 which should be recorded into data of a format suitable for recording onto the hard disk and outputs the resulting data to the recording and reproduction circuit 2 under the control of the central processing unit 4.

Further, the controller 3 transmits, from data inputted thereto from the recording and reproduction circuit 2, management data which have been reproduced from the innermost circumferential record area of the hard disk, to the central processing unit 4 so that the central processing unit 4 can access the hard disk in accordance with the management data. The controller 3 processes, from the data inputted thereto from the recording and reproduction circuit 2 in this manner, data of a file designated by the central processing unit 4 reversely to that in the processing performed upon recording and outputs resulting data to the host computer.

Further, the controller 3 outputs status data outputted from the central processing unit 4 to the host computer and outputs management data to the recording and reproduction circuit 2. The controller 3 thus accesses a desired sector of the hard disk and records management data necessary for the accessing to the innermost circumferential record area of the hard disk.

In the processes described above, the controller 3 converts recording data inputted thereto from the host computer into blocks, for example, in a unit of 512 bytes and adds an error correction code of 21 bytes to each block. The controller 3 executes recording and/or reproduction processing in a unit of a block of 512+21 bytes produced in this manner.

More particularly, in the controller 3, a host interface 7 forms an input/output interface with the host computer, and receives data D1 to be recorded from the host computer and outputs the data D1 to a bus controller 8. Conversely, the host interface 7 outputs data D1 reproduced from the hard disk and outputted from the bus controller 8 to the host computer. Further, the host interface 7 outputs a control command inputted thereto from the host computer to the central processing unit 4, but outputs status data outputted from the central processing unit 4 to the host computer.

The bus controller 8 receives data D1 to be recorded from the host interface 7 and temporarily stores the data D1 into the random access memory 5. The bus controller 8 reads out the data D1 stored in the random access memory 5 in this manner in a unit of 512 bytes and outputs the data D1 to a C1 code processing circuit 9 under the control of a sequencer 10.

The bus controller 8 conversely receives, upon reproduction, data D1 reproduced in a unit of 512 bytes from the C1 code processing circuit 9 under the control of the sequencer 10 and temporarily stores the data D1 into the random access memory 5. The bus controller 8 reads out the data D1 temporarily stored in the random access memory 5 in response to processing of the host interface 7 and outputs the data D1 to the host interface 7. If a retry mode is set by the sequencer 10, then the bus controller 8 updates the data stored in the random access memory 5 with the data D1 outputted from the C1 code processing circuit 9. Consequently, the data D1 stored in the random access memory 5 are updated with the data D1 reproduced correctly by the retrying operation, and the correct data D1 are outputted. Further, the bus controller 8 processes management data to be outputted to or inputted from the central processing unit 4 similarly to the data to be outputted to or inputted from the host interface 7.

The C1 code processing circuit 9 produces, upon recording, an error correction code (C1 code) of 21 bytes for the data D1 outputted in a unit of 512 bytes from the bus controller 8, adds the error correction code to the data D1 of 512 bytes and outputs resulting data to a disk controller 11. Upon reproduction, the C1 code processing circuit 9 performs error correction processing for data D1 inputted thereto from the disk controller 11 and having an error correction code added thereto and outputs resulting data to the bus controller 8. Thereupon, the C1 code processing circuit 9 transmits a notification of a result of the error correction processing to the sequencer 10.

Upon recording, the disk controller 11 adds data of a header to data inputted thereto in a unit of 512+21 bytes from the C1 code processing circuit 9 and outputs resulting data to the recording and reproduction circuit 2 under the control of the sequencer 10. On the other hand, upon reproduction, the C1 code processing circuit 9 receives reproduction data of the data recorded in this manner from the recording and reproduction circuit 2 and outputs the reproduction data to the C1 code processing circuit 9. Consequently, the magnetic disk apparatus 1 can record or reproduce desired data in a unit of a sector which is formed from data of 512+21 bytes.

The sequencer 10 is a controller for controlling operation of the controller 3 and controls operation timings of the circuit blocks to control operation of the entire magnetic disk apparatus 1 so that a desired sector of the hard disk may be accessed. In the sequence of processing operations, upon reproduction, the sequencer 10 receives a notification of a result of error correction processing from the C1 code processing circuit 9, and controls operation of the entire magnetic disk apparatus 1 such that, if it detects an error in a reproduced sector, it changes over the mode of the magnetic disk apparatus 1 to a retry mode so that the sector is reproduced repetitively until no error is detected within a preset number of times of retrying operations.

The magnetic disk apparatus 1 thus has a high random access capability and can reproduce data with a high degree of reliability.

FIG. 4 shows a magnetic disk apparatus for recording and reproducing image data, audio data and so forth. Referring to FIG. 4, the magnetic disk apparatus shown is denoted at 21 and includes several similar components to those of the magnetic disk apparatus 1 described hereinabove with reference to FIG. 3. The similar components are denoted by like reference numerals in FIG. 4 and overlapping description of them is omitted here to avoid redundancy.

The magnetic disk apparatus 21 includes a controller 3A which accesses a hard disk and communicates data with a host computer similarly to the controller 3 described above. In such accessing or communication, the controller 3A sets the sector length, for example, to several tens kilobytes and accesses the hard disk in a unit of several tens kilobytes of data. The magnetic disk apparatus 21 further includes a random access memory (RAM) 5A formed from a memory of a large capacity corresponding to the unit in recording and reproduction.

Thus, a bus controller 8A of the controller 3A temporarily stores, upon recording, AV data inputted thereto from the host computer into the random access memory 5A through a host interface 7, reads out the AV data in a unit of a data amount corresponding to the unit in recording and reproduction from the random access memory 5A under the control of a sequencer 10A, and outputs the AV data to a C1 code processing circuit 9A and a C2 code processing circuit 22. In this instance, the bus controller 8A reads out the AV data temporarily stored in the random access memory 5A in a predetermined sequence, shuffles the data to be recorded in the unit in recording and reproduction and outputs resulting data.

Upon reproduction, operation proceeds conversely. In particular, error-corrected AV data outputted from the C2 code processing circuit 22 are temporarily stored into the random access memory 5A and outputted to the host interface 7. The bus controller 8A deshuffles the reproduced AV data conversely to that upon recording and stores resulting data into the random access memory 5A.

The C2 code processing circuit 22 produces, upon recording, a C2 code, which is an outer code of an error correction code of the product code type, based on data inputted thereto from the bus controller 8A, and outputs the thus produced C2 code. Upon reproduction, the C2 code processing circuit 22 performs error correction processing for AV data outputted from the C1 code processing circuit 9A with a C2 code added in this manner and outputs resulting data.

Upon recording, the C1 code processing circuit 9A produces a C1 code, which is an inner code, for AV data inputted thereto from the bus controller 8A and a C2 code outputted from the C2 code processing circuit 22 and outputs the thus produced C1 code to a disk controller 1A. Upon reproduction, the C1 code processing circuit 9A receives AV data outputted from the disk controller 11A, performs error correction processing for the AV data with a C1 code added to the AV data and outputs resulting data to the C2 code processing circuit 22. Thereupon, the C1 code processing circuit 9A transmits a notification of a result of the error correction processing to the sequencer 10A.

The disk controller 11A delimits AV data of one sector length of a unit of several tens kilobytes with a data unit corresponding to a physical sector of the hard disk, adds a header to each of the delimited data units and outputs resulting data. Further, the disk controller 11A outputs AV data inputted thereto from the recording and reproduction circuit 2 to the C1 code processing circuit 9A.

The sequencer 10A is a controller for controlling operation of the controller 3A and controls timings of the circuit blocks to control operation of the entire magnetic disk apparatus 21 so that a desired sector of the hard disk may be accessed. In the sequence of processing operations, upon reproduction, if an error which is difficult to correct with a C2 code in a recording unit of reproduced data is detected based on a notification of a result of error correction processing received from the C1 code processing circuit 9A, the sequencer 10A changes over the operation mode of the entire magnetic disk apparatus 21 to a retry mode and controls the operation of the entire magnetic disk apparatus 21 so that the corresponding sector may be repetitively reproduced until no error is detected within a range of a predetermined set number of times of retrying operations.

In the control described above, since the sequencer 10A has an error correction capability strengthened with an error correction code of the product code type, the number of times of retrying operations is reduced significantly from that by the sequencer 10 described hereinabove with reference to FIG. 3. If correction of an error by a number of times of retrying operations within the predetermined number of retrying operations is difficult, then a notification representing this is transmitted to the host computer through the central processing unit 4. Where AV data are involved, even if error correction is difficult in this manner, it is possible to make use of interpolation processing with data preceding and following the error to substantially make it difficult for a user to perceive the error. This allows the magnetic disk apparatus 21 to reproduce AV data on the real time basis.

Also when AV data are reproduced, random access capability is required upon search and so forth. In this instance, the sector length can be set shorter as in the case of processing of a computer file so that a comparatively small amount of data may be read out from the hard disk to reproduce AV data thereby to augment the random access capability.

In this instance, however, since the sector length is reduced, a retrying operation must be repeated by a greater number of times, and the real time capability is deteriorated as much.

One of possible solutions to this problem is to make the sector length shorter and add an error correction code of the product code type to strengthen the error correction capability and reduce the number of times of retrying operations. However, this solution significantly increases the redundancy and disables effective utilization of an information recording surface of the hard disk.

Thus, a conventional apparatus of the type described is disadvantageous in that it is difficult to satisfy both of the random access capability and the real time performance.

SUMMARY OF THE INVENTION

It is an object of the present invention to provide an information recording apparatus and method, an information reproduction apparatus and method and an information recording medium which satisfy both of the random access capability and the real time performance.

In order to attain the object described above, the present invention adopts a countermeasure by which blocks each including a first error correction code for a predetermined unit amount of data and blocks each including a second error correction code for a plurality of such blocks can be reproduced independently of each other such that, when necessary, error correction processing may be performed using the second error correction codes thereby to satisfy both of the real time performance and the random access capability.

In particular, according to the first aspect of the present invention, there is provided an information recording apparatus for recording various data onto a recording medium, comprising first error correction code processing means for delimiting the data in a unit of a predetermined data amount in a time series and successively adding a first error correction code to each of the data of the predetermined data amount to successively form first blocks each of which includes the data of the predetermined data amount and the first error correction code, second error correction code processing means for successively producing a second error correction code for the data of each predetermined number of the first blocks to successively form second blocks whose unit data amount is equal to the data amount of each first block, and means for successively recording the first and second blocks onto the recording medium such that the first and second blocks can be reproduced independently of each other from the recording medium.

According to another aspect of the present invention, there is provided an information recording method for recording various data onto a recording medium, comprising the steps of delimiting the data in a unit of a predetermined data amount in a time series and successively adding a first error correction code to each of the data of the predetermined data amount to successively form first blocks each of which includes the data of the predetermined data amount and the first error correction code, successively producing a second error correction code for the data of each predetermined number of the first blocks to successively form second blocks whose unit data amount is equal to the data amount of each first block, and successively recording the first and second blocks onto the recording medium such that the first and second blocks can be reproduced independently of each other from the recording medium.

According to a further aspect of the present invention, there is provided an information reproduction apparatus for reproducing data recorded on a recording medium, the data including first blocks and second blocks recorded successively on the recording medium, each of the first blocks including delimited object data of a predetermined data amount unit and a first error correction code added to the delimited object data, the first blocks being recorded in a time series on the recording medium, each of the second blocks including a second error correction code for the data of each predetermined number of the first blocks and having a unit data amount equal to the data amount of each first block, the information reproduction apparatus includes mode setting means for selectively setting an operation mode of the information reproduction apparatus between a first operation mode in which the data recorded on the recording medium should be reproduced by error correction processing utilizing the first and second error correction codes and a second operation mode in which the data recorded on the recording medium should be reproduced by error correction processing utilizing the first error correction codes, and reproduction means for reproducing the data recorded on the recording medium in the operation mode set by the mode setting means.

According to a still further aspect of the present invention, there is provided an information reproduction method for reproducing data recorded on a recording medium, the data including first blocks and second blocks recorded successively on the recording medium, each of the first blocks including delimited object data of a predetermined data amount unit and a first error correction code added to the delimited object data, the first blocks being recorded in a time series on the recording medium, each of the second blocks including a second error correction code for the data of each predetermined number of the first blocks and having a unit data amount equal to the data amount of each first block, the information reproduction method includes the steps of selectively setting an operation mode between a first operation mode in which the data recorded on the recording medium should be reproduced by error correction processing utilizing the first and second error correction codes and a second operation mode in which the data recorded on the recording medium should be reproduced by error correction processing utilizing the first error correction codes, and reproducing the data recorded on the recording medium in the set operation mode.

According to a yet further aspect of the present invention, there is provided an information recording medium on which data are recorded, the data including first blocks and second blocks recorded successively on the recording medium such that the first and second blocks can be reproduced independently of each other, each of the first blocks including delimited object data of a predetermined data amount unit and a first error correction code added to the delimited object data, the first blocks being recorded in a time series on the recording medium, each of the second blocks including a second error correction code for the data of each predetermined number of the first blocks and having a unit data amount equal to the data amount of each first block.

With the information recording apparatus and method, the information reproduction apparatus and method and the information recording medium according to the present invention, first blocks each of which includes a first error correction code for data of a unit of a predetermined data amount and second blocks each of which includes a second error correction code for the data of each predetermined number of the first blocks are recorded in such a manner that they can be reproduced independently of each other. Consequently, it is possible to use a small sector length which is a minimum unit of recording and reproduction with first error correction codes and form second error correction codes as independent sectors. Thus, for example, for a data file of a comparatively small size which is used frequently by a computer, a high random access capability can be assured by reproducing the data of the first blocks each of which includes data of the predetermined data amount and the first error correction code. On the other hand, for example, for a file of a comparatively large size such as an AV data file, by reproducing the data of the first blocks and the second blocks each of which includes a second error code for the data of the predetermined number of first blocks, a high error correction capability can be assured while preventing an increase in redundancy, and consequently, a high real time performance can be assured. As a result, when necessary, error correction processing can be performed only with the first error correction codes to give priority to the random access capability, or alternatively, error correction processing can be performed with the first and second error correction codes to give priority to the real time performance. Consequently, both of the real time performance and the random access capability can be satisfied. Accordingly, data files which are frequently used by a computer and for which a high random access capability is required and data files which are frequently used for video data and so forth and for which the real time performance is required can be recorded in a mixed condition onto a recording medium and can be selectively reproduced from the recording medium. This assures a high degree of convenience in use of the recording medium.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is block diagram showing a magnetic disk apparatus to which the present invention is applied;

DESCRIPTION OF THE PREFERRED EMBODIMENT

Figures 1, 1A, 1B, 2:
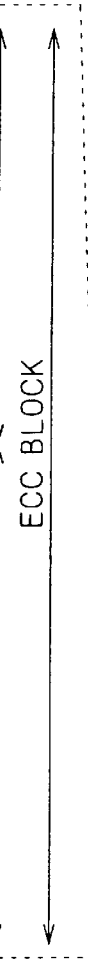
FIGS. 1A-1, 1A-2, 1B-1 and 1B-2 schematic diagrammatic representations illustrating operation of a magnetic disk apparatus to which the present invention is applied.
Figure 2:
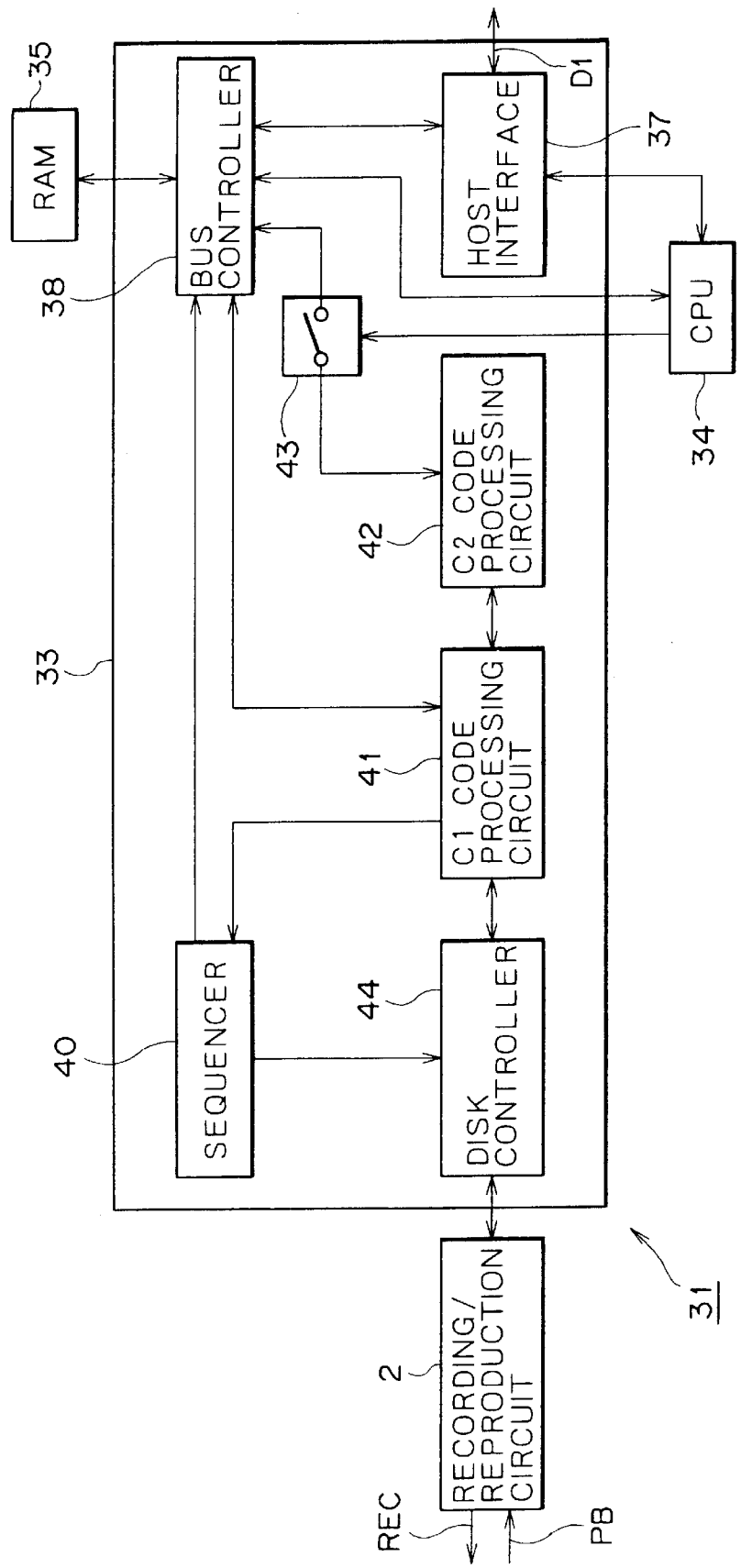
Figure 3:
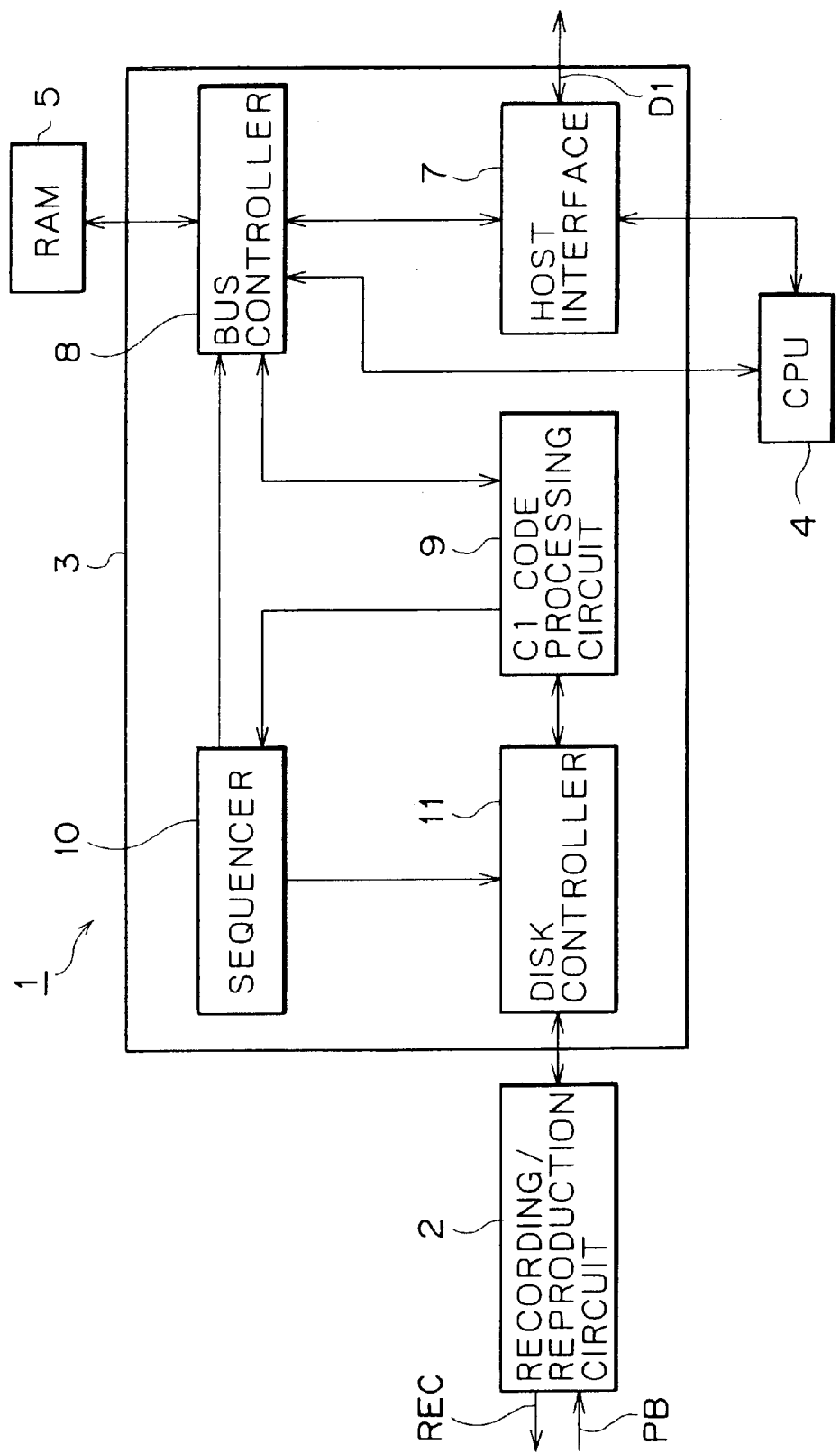
FIG. 3 is a block diagram showing a conventional magnetic disk apparatus.
Figure 4:
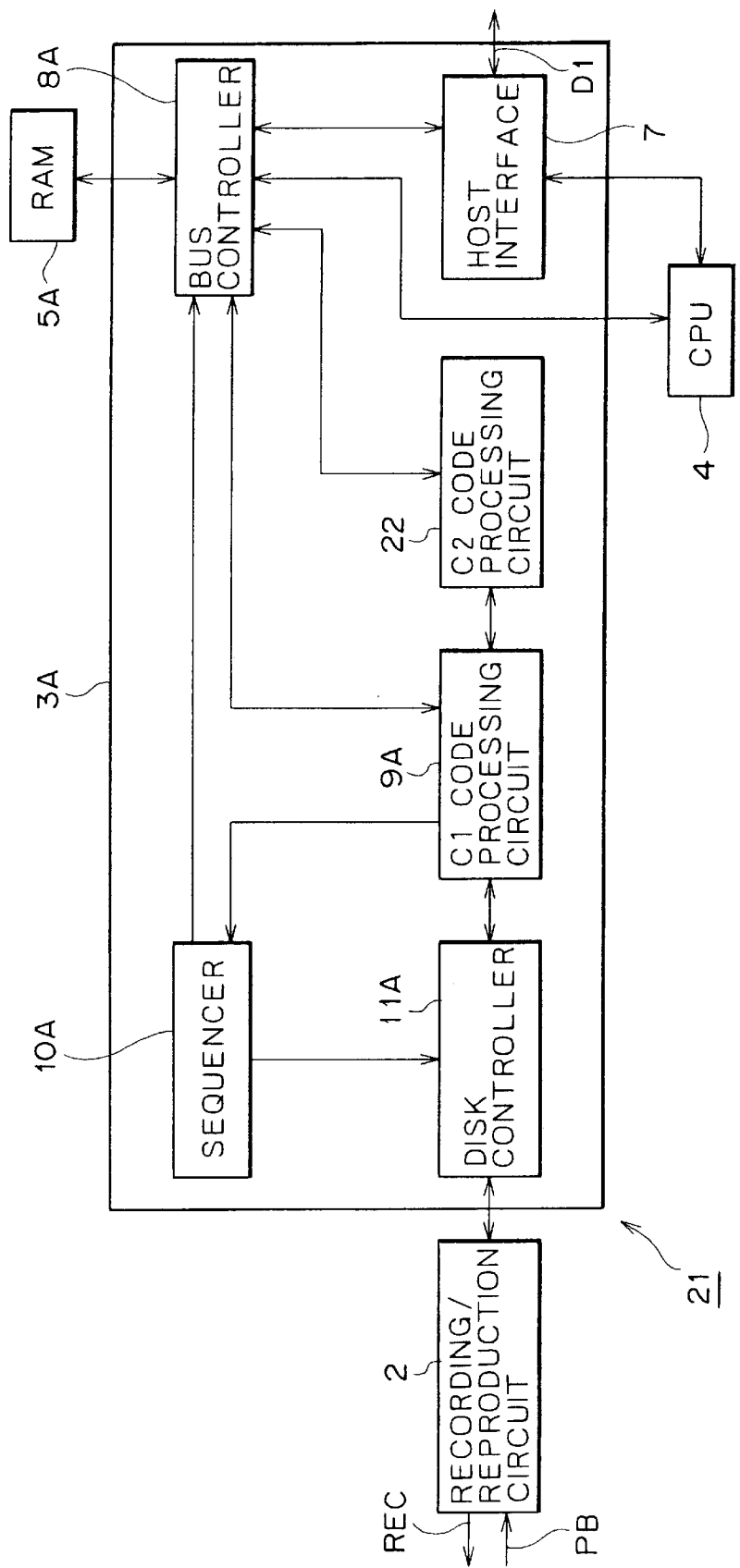
FIG. 4 is a block diagram showing a magnetic disk apparatus for recording and reproducing AV data.

Referring to FIG. 2, there is shown a magnetic disk apparatus to which the present invention is applied. The magnetic disk apparatus is generally denoted at 31 and records data D1 outputted from a host computer not shown onto a removable magnetic disk, and reproduces the data D1 recorded on the magnetic disk and outputs the reproduced data D1 to the host computer. The magnetic disk apparatus 31 includes several common components to those of the magnetic disk apparatus 1 and 21 described hereinabove with reference to FIGS. 3 and 4. In FIG. 2, such common components are denoted by like reference symbols and overlapping description of them is omitted here to avoid redundancy.

The magnetic disk apparatus 31 includes a controller 33 which accesses the magnetic disk and transmits and receives data to and from the host computer similarly to the controller 3 described hereinabove.

Similarly as in a conventional hard disk apparatus which processes a computer file, the controller 33 converts data D1 to be recorded into sectors in a unit of 512 bytes in a time series, adds a C1 code of 21 bytes to each data D1 of 512 bytes and records the data D1 with a small sector length. Further, the controller 33 inserts, for each plurality of sectors, a C2 code for a unit of 512 bytes corresponding to the one sector length and C1 codes corresponding to the C2 code in accordance with an attribute of the data to be recorded under the control of the central processing unit 34 to record the input data D1.

It is to be noted that, in the following description, the mode of recording of data to which only C1 codes are added is referred to as recording mode with C1 codes, and the mode of recording of data to which C1 codes and C2 codes are added is referred to as a recording mode with C1 and C2 codes.

Referring to FIGS. 1A-1, 1A-2, 1B-1 and 1B-2, in the recording mode with C1 codes, the controller 33 delimits a continuous data train in each unit of 512 bytes and adds a C1 code of 21 bytes to each data of 512 bytes to construct data of one sector (refer to FIGS. 1A-1 and 1A-2). The controller 33 adds a header including a synchronization pattern, a sector ID and other necessary information to each of the sectors produced in this manner and successively records the sectors onto the magnetic disk.

On the other hand, in the recording mode with C1 and C2 codes, the controller 33 adds, for data of each 32 sectors produced in a similar manner as in the recording mode with C1 codes, four sectors each including a C2 code of 512 bytes and a C1 code of 21 bytes for the C2 code (refer to FIGS. 1B-1 and B-2). Consequently, in the recording mode with C1 and C2 codes, the controller 33 forms a block (ECC block) for error correction processing formed from a product code in a unit of 36 sectors and records the resulting AV data of the ECC block. The controller 33 thus prevents an increase of the redundancy effectively and increases the error correction capability.

In this instance, the controller 33 successively allocates the AV data to the sectors in a time series to form blocks for error correction processing so that, even if an entire block for error correction processing is not reproduced, the controller 33 can selectively reproduce a desired one of the sectors of the block for error correction processing to reproduce the AV data of the sector as seen, for example, from a sector indicated by slanting lines in FIG. 1B-2 thereby to allow error correction to be performed although such correction can be made only with C1 codes.

Thus, the magnetic disk apparatus 31 utilizes a reduced sector length as a minimum unit for recording and reproduction and places C2 codes, which are used to form an error correction code as a dual product code, into an independent sector. Consequently, the magnetic disk apparatus 31 can process data adding or ignoring C2 codes in accordance with the necessity, thereby achieving satisfaction of both of the real time performance and the random access capability.

It is to be noted that the controller 33 can apply the Reed-Solomon code, which is a kind of systematic code, as the error correction code composed of C1 and C2 codes.

A central processing unit (CPU) 34 receives a control command transmitted from the host computer through the controller 33 and controls operation of the controller 33 in accordance with the control command. The central processing unit 34 thus controls operation of the entire magnetic disk apparatus 31 so that a file outputted from the host computer may be recorded onto the magnetic disk and controls operation of the entire magnetic disk apparatus 31 so that conversely a file designated by the host computer may be reproduced from the magnetic disk.

In the control described above, the central processing unit 34 confirms a free area of the magnetic disk and other necessary conditions based on management data recorded on the innermost circumferential record area of the magnetic disk and controls the sequence of operations. Further, when necessary, the central processing unit 34 transmits status data corresponding to the control command to the host computer through the controller 33.

The central processing unit 34 determines an attribute of data to be recorded in accordance with file information inputted thereto from the host computer together with the control command. If the data D1 to be recorded are AV data, then the central processing unit 34 changes over the operation mode to the recording mode with C1 and C2 codes. If the data D1 to be recorded are not AV data, then the central processing unit 34 changes over the operation mode to the recording mode with C1 codes. After recording of the file is completed in the operation mode, the central processing unit 34 delivers an instruction to update the management data on the innermost circumferential record area of the magnetic disk and allocates the file information and the recording mode to the management data then.

If an instruction to reproduce a file is received from the host computer, then the central processing unit 34 determines the attribute of the file and the recording mode from the management data. If a result of the determination indicates that normal reproduction should be performed for the AV data recorded in the recording mode with C1 and C2 codes in this manner, then the central processing unit 34 delivers an instruction to perform error correction processing with C1 and C2 codes to reproduce the AV data. For reproduction of data recorded in the recording mode with C1 codes, the central processing unit 34 delivers an instruction to perform error correction processing with C1 codes to reproduce the data.

On the other hand, if an instruction to perform reproduction in which priority should be given to the random access capability such as, for example, fast feeding or search for AV data recorded in the recording mode with C1 and C2 codes is delivered from the host computer, then the central processing unit 34 changes over the operation mode of the entire magnetic disk apparatus 31 so that the AV data may be reproduced using error correction processing in which only C1 codes are used (the mode is hereinafter referred to as reproduction mode only with C1 codes).

If an instruction to effect high speed rewriting for the AV data recorded in the recording mode with C1 and C2 codes in this manner is delivered from the host computer, then the central processing unit 34 outputs an instruction to update the corresponding sector with the data D1 inputted thereto from the host computer in the recording mode with C1 codes. Further, in response to an instruction from the host computer, the central processing unit 34 outputs an instruction to update a C2 code corresponding to the sector updated in this manner and the C1 code for the C2 code making use of a free time.

A random access memory (RAM) 35 temporarily stores data outputted from the controller 33 and outputs the data to the controller 33 to thereby buffer data to be communicated between the host computer and the controller 33.

A host interface 37 forms an input/output circuit from and to the host computer. In particular, the host interface 37 receives data D1 to be recorded from the host computer and outputs the data D1 to a bus controller 38. On the other hand, the host interface 37 outputs reproduction data outputted from the bus controller 38 to the host computer reversely. Further, the host interface 37 outputs a control command inputted thereto from the host computer to the central processing unit 34, and outputs status data outputted from the central processing unit 34 to the host computer.

The bus controller 38 receives data to be recorded from the host interface 37 and temporarily stores the data into the random access memory 35. Further, the bus controller 38 reads out the data stored in the random access memory 35 as described above in a unit of 512 bytes under the control of a sequencer 40 and outputs the data to a C1 code processing circuit 41 and a C2 code processing circuit 42.

Upon reproduction, the bus controller 38 conversely receives data reproduced in a unit of 512 bytes from the C1 code processing circuit 41 or the C2 code processing circuit 42 under the control of the sequencer 40 and temporarily stores the data into the random access memory 35. The bus controller 38 reads out the temporarily stored data from the random access memory 35 in response to processing of the host interface 37 and outputs the data to the host interface 37.

If a retry mode is set by the sequencer 40, then the bus controller 38 updates the data stored in the random access memory 35 with the data outputted from the C1 code processing circuit 41 or the C2 code processing circuit 42 thereby to update the data stored in the random access memory 35 with data correctly reproduced as a result of a retrying operation, and outputs the updated data.

In contrast, in updating processing performed, after a desired sector is updated in the recording mode with C1 codes in high speed rewriting, for corresponding a C2 code and a C1 code for the C2 code making use of a free time, the bus controller 38 stores AV data outputted from the C1 code processing circuit 41 into the random access memory 35 in a unit of a block for error correction processing with a product code described above and then outputs the AV data in a unit of a sector of 512 bytes to the C1 code processing circuit 41 and the C2 code processing circuit 42.

It is to be noted that the bus controller 38 processes management data to be transmitted to or received from the central processing unit 34 similarly to data to be outputted to or inputted from the host interface 37.

The C2 code processing circuit 42 receives, upon recording, AV data outputted from the bus controller 38 through a switch circuit 43, produces C2 codes based on the AV data and outputs the C2 codes to the C1 code processing circuit 41. In the recording mode with C1 and C2 codes, the switch circuit 43 outputs AV data outputted from the bus controller 38 to the C2 code processing circuit 42 under the control of the central processing unit 34. Further, updating processing performed, after a desired sector is updated in the recording mode with C1 codes in high speed rewriting, for corresponding a C2 code and a C1 code for the C2 code making use of a free time, the switch circuit 43 outputs AV data outputted from the bus controller 38 to the C2 code processing circuit 42 similarly.

On the other hand, upon reproduction, if an instruction to perform error correction processing with C1 and C2 codes is received from the central processing unit 34, then the C2 code processing circuit 42 performs error correction processing for AV data outputted from the C1 code processing circuit 41 with the C2 codes added to the AV data and outputs resulting data to the bus controller 38.

The C1 code processing circuit 41 produces, upon recording, a C1 code of 21 bytes for data outputted in a unit of 512 bytes from the bus controller 38, adds the C1 code to the data of 512 bytes and outputs resulting data to a disk controller 44. In the recording mode with C1, the C1 code processing circuit 41 additionally performs production of a C1 code for a C2 code outputted from the C2 code processing circuit 42 and outputs the C1 code and the C2 code to the disk controller 44. Further, upon updating processing performed, after a desired sector is updated in the recording mode with C1 codes in high speed rewriting, for a corresponding C2 code and a C1 code for the C2 code making use of a free time, the C1 code processing circuit 41 stops outputting of the AV data and the corresponding C1 code, but outputs only the C2 code outputted from the C2 code processing circuit 42 and the C1 code corresponding to the C2 code to the disk controller 44.

In the processing described above, the C1 code processing circuit 41 divides data of 512 bytes for one sector into three sub blocks of 170 bytes, 171 bytes and 171 bytes and adds a parity code in the form of a Reed-Solomon code of 7 bytes to each of the sub blocks to allocate a C1 code. Similarly, the C1 code processing circuit 41 divides a C2 code of 512 bytes for one sector into three sub blocks of 170 bytes, 171 bytes and 171 bytes and allocates 7 bytes of a C1 code to each of the sub blocks.

Upon reproduction, the C1 code processing circuit 41 performs error correction processing for data inputted thereto from the disk controller 44 with a C1 code added to the data and outputs resulting data to the bus controller 38 and the C2 code processing circuit 42. Further, the C1 code processing circuit 41 sends a result of the error correction processing to the sequencer 40.

Upon recording, the disk controller 44 adds data of a header to data inputted thereto in a unit of 512+21 bytes from the C1 code processing circuit 41 and outputs resulting data to the recording and reproduction circuit 2 under the control of the sequencer 40. Upon reproduction, the disk controller 44 receives reproduction data originating the data recorded in this manner from the recording and reproduction circuit 2 and outputs the reproduction data to the C1 code processing circuit 41.

The sequencer 40 is a controller for controlling operation of the controller 33 and controls timings of the circuit blocks to control operation of the entire magnetic disk apparatus 31 so that a desired sector of the hard disk may be accessed. In the sequence of operations described above, upon reproduction, the sequencer 40 receives a notification of a result of error correction processing from the C1 code processing circuit 41 and changes over the operation mode of the entire magnetic disk apparatus 31 to a retry mode if an error is detected from the reproduced sector to control operation of the entire magnetic disk apparatus 31 so that the corresponding sector may be reproduced repetitively within a range of a predetermined number of times of repetitions.

When error correction processing with C1 codes is to be performed to reproduce data, the sequencer 40 repeats a retrying operation under the control of the central processing unit 34 until no error is detected any more within the range of the preset number of times of repetitions. On the other hand, when error correction processing with C1 and C2 codes is to be performed to reproduce data, the sequencer 40 changes over the operation mode of the entire magnetic disk apparatus 31 to a retry mode only when error correction with C2 codes is difficult. In this instance, a retrying operation is repeated until error correction with C2 codes becomes possible within a predetermined number of times of repetitions.

Here, the limit number of times of repetitions for a retrying operation when error correction processing with C1 and C2 codes is performed to reproduce data is set so that it is significantly smaller than the limit number of times of repetitions for a retrying operation when error correction processing with C1 codes is performed to reproduce data.

On the other hand, in updating processing performed, after a desired sector is updated in the recording mode with C1 codes in high speed rewriting, for corresponding a C2 code and a C1 code for the C2 code making use of a free time, the sequencer 40 delivers an instruction to reproduce AV data of the block for error correction by a product code which is an object of processing and then controls operation of the entire magnetic disk apparatus 31 so that data outputted from the C1 code processing circuit 41 may be recorded onto the corresponding sector.

In the magnetic disk apparatus 31 having the construction described above, a control command from the host computer is received by the central processing unit 34 through the host interface 37, and data D1 received from the host computer following the control command are recorded onto the magnetic disk. Further, the data recorded on the magnetic disk are reproduced and outputted to the host computer. In this instance, if necessary, status data corresponding to the control command are sent out from the central processing unit 34 and transmitted to the host computer through the host interface 37.

In the operation performed in response to the control command in this manner, if an instruction to record data is received from the host computer, then an attribute of the data to be recorded is detected from file information added to the control command in the magnetic disk apparatus 31. If the attribute indicates that the data D1 to be recorded are, for example, other than AV data, then the data D1 are normal computer data of a file of a comparatively small length for which the random access capability is required preferentially. Therefore, the magnetic disk apparatus 31 records the data D1 onto the magnetic disk in the recording mode with C1 codes.

More particularly, the data D1 outputted from the host computer are stored once into the random access memory 35 through the host interface 37 and the bus controller 38. The data D1 are read out from the random access memory 35 in a unit of 512 bytes in an order in which the data D1 have been inputted to the random access memory 35, and inputted to the C1 code processing circuit 41. The C1 code processing circuit 41 adds a C1 code of 21 bytes to the data D1 for each 512 bytes thereby to successively form sectors of 512+21 bytes (FIGS. 1A-1 and A-2). To the data of each of the sectors formed in this manner, a header including an ID for specifying a recording/reproduction position, a synchronization pattern and other necessary information is added by the disk controller 44. Resulting data is converted into a driving signal by the recording and reproduction circuit 2 and outputted to the magnetic head not shown. Consequently, the data D1 outputted from the host computer are recorded in sectors of a small sector length of 512 bytes onto the magnetic disk such that the sectors can be reproduced independently of one another.

On the other hand, when the attribute of the data described above indicates that the data D1 to be recorded are AV data, the data D1 are of a comparatively long file for which normally the real time performance is required preferentially, or the random access capability may possibly be required alternatively. Therefore, the magnetic disk apparatus 31 uses the recording mode with C1 and C2 codes to record the data D1 onto the magnetic disk.

More particularly, the data D1 outputted from the host computer are stored once into the random access memory 35 through the host interface 37 and the bus controller 38. The data D1 are read out from the random access memory 35 in a time sequence in an order in which they have been inputted in a unit of 512 bytes, and inputted to the C1 code processing circuit 41 and the C2 code processing circuit 42.

The C2 code processing circuit 42 produces C2 codes of 512×4 bytes for a unit of 512×32 bytes of the AV data D1, and outputs the C2 codes to the C1 code processing circuit 41. Meanwhile, the C1 code processing circuit 41 adds a C1 code of 21 bytes successively to the AV data D1 for each 512 bytes to successively form sectors of 512 bytes+21 bytes. Further, the C1 code processing circuit 41 adds a C1 code of 21 bytes successively to each C2 code of 512 bytes to successively form sectors of 512 bytes+21 bytes similarly (FIGS. 1B-1 and 1B-2).

To the data of each of the sectors formed in this manner, a header including an ID for specifying the recording/reproduction position, a synchronization pattern and other necessary information is added by the disk controller 44. Resulting data are converted into a driving signal by the recording and reproduction circuit 2 and outputted to the magnetic head. Consequently, the AD data D1 outputted from the host computer are recorded in sectors of a small sector length of a unit of 512 bytes onto the magnetic disk such that they can be reproduced independently of one another.

Consequently, the data D1 have error correction codes of a product code type allocated thereto and therefore have a strengthened error correction capability while an increase in redundancy is prevented effectively. Since the sector length which is a minimum unit for recording and reproduction is set to a comparatively small length, the AV data D1 can be reproduced with priority given to the random access capability by reproducing only a desired sector and performing error correction processing for the sector with a C1 code when necessary. On the other hand, normal reproduction can be performed with priority given to the real time performance by performing error correction processing with C1 and C2 codes for a unit of a block for error correction.

The AV data recorded on the magnetic disk can be reproduced even by a magnetic disk apparatus which only has a function of error correction processing with C1 codes.

In particular, even if the magnetic disk apparatus 31 otherwise has a function only of error correction processing with C1 codes, when a control command for reproduction is inputted from the host computer, the magnetic disk apparatus 31 detects, from management data recorded on the innermost circumferential record area of the magnetic disk, corresponding file information and detects an attribute of the object data from the file information.

If the attribute indicates that reproduction of data other than AV data should be performed, the magnetic head is positioned at a recording/reproduction position detected from the management data, and a reproduction signal obtained from the magnetic head at the recording/reproduction position is processed by the recording and reproduction circuit 2. Consequently, the data recorded at the recording/reproduction position are reproduced in a unit of a sector. The thus reproduced data are inputted to the C1 code processing circuit 41 through the disk controller 44.

The reproduction data are subject to error correction processing with C1 codes by the C1 code processing circuit 41 and then temporarily stored into the random access memory 35 through the bus controller 38, whereafter they are outputted to the host computer through the host interface 37. A notification of a result of the error correction processing by the C1 code processing circuit 41 is transmitted to the sequencer 40. If an error which is difficult to correct is detected by the sequencer 40, then a retrying operation is repeated until correct reproduction data are obtained within the predetermined number of times of repetitions. Further, the reproduction data stored in the random access memory 25 are updated with reproduction data obtained repetitively by each retrying operation. Consequently, data of the type described which are normal computer data or the like are reproduced from the magnetic disk with a high degree of reliability by repeating retrying processing in accordance with the necessity with priority given to the random access capability, and the reproduced data are outputted.

On the other hand, if an instruction to reproduce AV data is received, then reproduction data obtained in a unit of a sector from the recording and reproduction circuit 2 are inputted to the C1 code processing circuit 41 through the disk controller 44 similarly. The reproduction data in the form of AV data are subject to error correction processing with C1 codes in a unit of a sector by the C1 code processing circuit 41 and then subject to error correction processing with C2 codes in a unit of an error correction block by the C2 code processing circuit 42, and resulting data are outputted to the host computer through the random access memory 35.

Consequently, AV data are reproduced from the magnetic disk with a significantly higher degree of reliability than that of normal computer data owing to the strengthened error correction capability, and the number of times of repetitions of a retrying operation can be reduced significantly as much and resulting data can be outputted on the real time basis to the host computer.

Upon such reproduction of AV data, if an instruction to perform high speed reproduction such as, for example, search or fast feeding is received from the host computer, then the magnetic disk apparatus 31 repetitively performs a seeking operation of the magnetic head to play back the magnetic disk intermittently in a unit of a sector, and reproduction data are outputted in a unit of a sector from the recording and reproduction circuit 2.

Reproduction data in the form of AV data obtained in this manner are subject to error correction processing with C1 codes by the C1 code processing circuit 41 similarly to normal computer data, and resulting data are outputted to the host computer through the random access memory 35. Further, a retrying operation is repeated in accordance with a result of the error correction processing then. Consequently, AV data which are reproduced, in normal reproduction, with priority given to the real time performance can be reproduced with priority given to the random access capability. Accordingly, the magnetic disk apparatus 31 can achieve satisfaction of both of the random access capability and the real time performance.

In contrast, if the magnetic disk apparatus 31 receives an instruction to perform high speed rewriting of AV data from the host computer, then AV data D1 outputted from the host computer and temporarily stored in the random access memory 35 are outputted in a unit of 512 bytes to the C1 code processing circuit 41, by which a C1 code is added to the data D1 in a unit of 512 bytes to form data of a sector. Further, a header is added to the data of each sector by the C1 code processing circuit 41, and resulting data are outputted from the recording and reproduction circuit 2 to the magnetic head so that only an object sector is updated. In such processing, the magnetic disk apparatus 31 of the present embodiment sets the sector length, which is a unit for recording and reproduction, to a small length and adopts a sector structure also for C2 codes. Consequently, not only reproduction of data but also updating of data with C2 codes ignored in this manner can be performed, and accordingly, AV data having a comparatively great file length can be locally updated at a high speed.

If a free time is entered after AV data are updated with C2 codes ignored in this manner, then the AV data are reproduced in a unit for error correction processing from the magnetic disk in accordance with conditions set in advance by the user, and the C2 code which has been rendered difficult to use as a result of the updating performed with the C2 codes ignored are produced anew from the reproduced AV data and recorded onto the magnetic disk. Consequently, also AV data which have been updated with C2 codes ignored in this manner can thereafter be reproduced arbitrarily giving priority to the random access capability or the real time performance.

In the magnetic disk apparatus 31 having the construction described above, sectors each including a C1 code as a first error correction code for AV data in a unit of 512 bytes and sectors each including a C2 code as second error correction code for an amount of data for four sectors can be reproduced independently of one another. Consequently, it is possible to use a small sector length which is a minimum unit of recording and reproduction with C1 codes and form C2 codes as independent sectors. As a result, it is possible to give priority to the real time performance by performing error correction processing using the C2 codes when necessary or to give priority to the random access capability by performing error correction processing only with the C1 codes ignoring the C2 codes, thereby achieving satisfaction of both of the real time performance and the random access capability.

Consequently, it is possible to record normal computer data, video data and audio data in a mixed condition and perform recording and/or reproduction processing with priority given to the real time performance or the random access capability in accordance with an attribute of pertaining data. Thus, the recording and reproduction apparatus is significantly augmented in the convenience of use.

It is to be noted that, while the embodiment described above adds a C1 code of 21 bytes to data of 512 bytes to form data of one sector, the present invention is not limited to this and can be applied widely to any apparatus wherein one sector is formed with any data length in accordance with the necessity.

Further, while the embodiment described above forms a block for error correction from 36 sectors, the present invention is not limited to this and can be applied widely to any apparatus which forms a block for error correction from any number of sectors in accordance with the necessity.

Furthermore, while the embodiment described above adds error correction codes including c1 codes and C2 codes which are inner codes and outer codes of a product code type, respectively, the present invention is not limited to this and can be applied widely to any apparatus which adds error correction codes including triple product codes, quadruple product codes or the like in accordance with the necessity.

Further, while the embodiment described above rewrites a sector of a C2 code making use of a free time after it updates AV data and C1 codes at a high speed ignoring the C2 code, the present invention is not limited to this, and the rewriting processing of a C2 code may be omitted in accordance with the necessity.

Further, while the magnetic disk apparatus in the embodiment described above produces C2 codes and performs error correction processing with C1 and C2 codes and outputs resulting AV data to the host computer, the present invention is not limited to this, and the production of C2 codes and the error correction processing with C2 codes may be performed on the host computer side. Where the construction just described is employed, similar advantages to those achieved by the embodiment described above can be achieved also with a magnetic disk apparatus having such a construction as described hereinabove with reference to FIG. 3.

Furthermore, while the embodiment described above records various data onto the removable magnetic disk, the present invention is not limited to this, and the present invention can be applied to recording of data onto various recording media such as a hard disk, a magnetic disk and an optical disk and also to reproduction of data recorded on various recording media.

While a preferred embodiment of the present invention has been described using specific terms, such description is for illustrative purposes only, and it is to be understood that changes and variations may be made without departing from the spirit or scope of the following claims.

What is claimed is:

1. An information reproduction apparatus for reproducing data recorded on a recording medium, said data including first blocks and second blocks recorded successively on the recording medium, each of the first blocks including delimited object data of a predetermined data amount unit and a first error correction code added to the delimited object data, the first blocks being recorded in a time series on the recording medium, each of the second blocks including a second error correction code for the data of each predetermined number of the first blocks and having a unit data amount equal to the data amount of each first block;

said information reproduction apparatus comprising:

mode setting means for selectively setting an operation mode of said information reproduction apparatus between a first operation mode in which the data recorded on the recording medium should be reproduced by error correction processing utilizing the first and second error correction codes and a second operation mode in which the data recorded on the recording medium should be reproduced by error correction processing utilizing the first error correction codes;

reproduction means for reproducing the data recorded on the recording medium in the operation mode set by said mode setting means; and wherein, in the second operation mode, said reproduction means reproduces the data on the recording medium beginning with one of the second blocks other than a top one of the second blocks.

2. An information reproduction method for reproducing data recorded on a recording medium, said data including first blocks and second blocks recorded successively on the recording medium, each of the first blocks including delimited object data of a predetermined data amount unit and a first error correction code added to the delimited object data, the first blocks being recorded in a time series on the recording medium, each of the second blocks including a second error correction code for the data of each predetermined number of the first blocks and having a unit data amount equal to the data amount of each first block;

said information reproduction method comprising the steps of:

selectively setting an operation mode between a first operation mode in which the data recorded on the recording medium should be reproduced by error correction processing utilizing the first and second error correction codes and a second operation mode in which the data recorded on the recording medium should be reproduced by error correction processing utilizing the first error correction code;

reproducing the data recorded on the recording medium in the set operation mode; and wherein, in the second operation mode, the data on the recording medium are reproduced beginning with one of the second blocks other than a top one of the second blocks.

* * * * *

UNITED STATES PATENT AND TRADEMARK OFFICE
CERTIFICATE OF CORRECTION

PATENT NO. : 6,694,092 B1
DATED : February 17, 2004
INVENTOR(S) : Nobuhiro Hayashi It is certified that error appears in the above-identified patent and that said Letters Patent is hereby corrected as shown below:

<u>Column 4,</u>
Line 44, change "1A." to -- 11A. --.

Signed and Sealed this

Seventeenth Day of August, 2004

JON W. DUDAS
*Acting Director of the United States Patent and Trademark Office*